3,093,682
HYDROXYALKANAL SULFONATES
William J. Sullivan, Oakland, Calif., assignor to Shell Oil Company, a corporation of Delaware
No Drawing. Filed Jan. 30, 1959, Ser. No. 790,064
6 Claims. (Cl. 260—513)

This invention relates to novel polyhydroxy alkane polysulfonates and to a process for their preparation. More specifically, it relates to new and useful polyhydroxy alkane polysulfonates which may be prepared from epoxy carbonylic compounds.

Although soap is still the most widely used detergent, it has definite limitations. Chief among them is that it is unstable in acid solutions, and many of its salts are insoluble. As a consequence, a large class of synthetic organic detergents which are not subject to these drawbacks has been developed. In general, these detergents comprise organic compounds which like soap have a hydrophilic group with strong residual or secondary valence forces, and a hydrocarbon radical of hydrophobic nature characterized by weak residual forces. These two essential groups may be linked directly together, as in the case of sulfated fatty alcohols, or they may be connected by an intervening group whose purpose is merely to link the hydrophobic and hydrophilic groups in advantageous configuration. The latter class of detergent is frequently prepared by reacting together intermediate compounds characterized by possession of either a hydrophobic or hydrophilic substituent.

It is an object of this invention to provide a novel class of detergents and detergent intermediates. A further object of the invention is the provision of a class of alkane intermediates characterized by a plurality of both hydrophilic sulfonate radicals and of esterifiable hydroxyl radicals. A still further object of the invention is the provision of a process whereby these useful intermediates may be prepared from epoxy alkyl compounds and, in particular, from epoxy alkanals. Other objects of the invention will be apparent from the following description thereof.

These objects are accomplished in my invention by novel hydroxy alkane sulfonates comprising an alkane chain having a hydroxyl radical on a chain carbon atom and a sulfonate radical attached to a chain carbon atom adjacent the hydroxyl-substituted carbon chain. They are further accomplished by novel polyhydroxy alkane polysulfonates which comprise an alkane chain wherein at least one carbon atom selected from the two terminal carbon atoms and the two carbon atoms adjacent the two terminal carbon atoms is substituted with a sulfonate radical and with a hydroxyl radical, at least one pair of chain carbon atoms adjacent one another is substituted with a sulfonate radical connected to one carbon atom and a hydroxyl radical connected to the other. By sulfonate radical, I mean the monovalent radical —SO$_2$OX, which is more conveniently written —SO$_3$X, wherein X is an alkali metal atom.

The structure and properties of these compounds can best be understood by a consideration of the manner in which they are prepared. The process for preparing them comprises reacting together an epoxy alkyl carbonylic compound selected from the group consisting of aldehydes and methyl ketones, with an alkali metal bisulfite, in the proportion of at least equimolar amounts of the bisulfite and the epoxy carbonylic compound. The epoxy-alkyl carbonylic compounds I employed are those which are prepared by the epoxidation of the olefinic double bonds in unsaturated aliphatic aldehydes and methyl ketones. They are characterized by their possession of at least one vincinal epoxy or oxirane group,

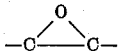

and by having a carbonylic substituent selected from the group of monovalent radicals consisting of formyl and ketonic radicals, that is, radicals having the structure

where R is either the hydrogen atom or a methyl radical.

Examples of unsaturated aldehydes which may be epoxidized to yield the epoxy compounds of this invention include methacrolein, crotonaldehyde, tiglic aldehyde, citral, and other aldehydes having one alpha,beta-olefinic double bond. Also included are epoxyaldehydes of unsaturated aldehydes having one or more double bond further removed from the formyl group, such as vinyl acetaldehyde, 3-pentenal, 4-pentenal, methyl vinyl acetaldehyde, isopropenyl acetaldehyde, citronellal, rhodinal, and 2-phenyl-4-hexenal. Of these compounds, the alkyl alpha,beta-monoepoxyaldehydes are preferred, especially those such as 2,3-epoxybutanal, having 3 to 10 carbon atoms, both because of their considerable reactivity and because of the desirable nature of the products of the invention. The most preferred alkyl alpha, beta-monoepoxyaldehyde is glycidaldehyde, that aldehyde prepared by the epoxidation of acrolein.

Equally suitable as epoxy carbonylic reactants in the process of my invention are epoxy methyl ketones. As in the case of epoxy-aldehydes, epoxy ketones are synthesized by epoxidation of unsaturated ketones. Examples of suitable ketones include methyl vinyl ketone, methyl allyl ketone, mesityl oxide, methyl butyl ketone, and the like. Preferred epoxy methyl ketones are those wherein the oxygen atom of at least one epoxy ring is connected to the alpha and beta carbon atoms with respect to the carbonylic carbon atom, and of those, the ketones having 4 to 10 carbon atoms are most preferred.

Carbonylic compounds having more than one formyl or ketonic carbonylic group, such as 2,3-epoxybutanedial and 3,4-epoxy-2,6-heptanedione, are also suitable for use in my process.

Of these classes of epoxy carbonylic compounds, the most reactive is that comprising the epoxyaldehydes, and these are therefore preferred reactants. Polyepoxyaldehydes, such as 2,3,4,5-diepoxypentanal, 2,3,5,6-diepoxyhexanal, and 2,3,5,6,8,9-triepoxy decanal are suitable compounds while, as noted above, monoepoxy alkanals are most preferred.

These epoxy carbonylic compounds are reacted with a molar equivalent or excess of an alkali metal bisulfite to give my novel alkane sulfonates and polyhydroxy polysulfonates. Such bisulfites may generally be described by the formula XHSO$_3$, where X is an alkali metal atom. While the bisulfites of all of the alkali metals may be employed in the preparation of my novel compounds, the bisulfites of the most common alkali metals, i.e. sodium and potassium, are preferred since they are the most available, cheapest, and most reactive.

It is most convenient to conduct my reaction in aqueous solution since both the epoxy carbonylic compounds and the alkali metal bisulfites are water soluble. The reaction is exothermic, and, therefore, the water will serve both as a diluent and coolant. While the preparation may be conducted at any temperature between 0° C. and 100° C., the reaction rates below about 10° C. are undesirably low, while above about 80° C. the reaction may take place with some violence. I, thus, prefer to conduct the reaction at a temperature from about 10° C. to about 80° C.

While the reaction may be conducted at atmospheric, superatmospheric or subatmospheric pressures, it is most convenient to carry it out at atmospheric pressure. Such inert atmospheres as nitrogen or helium may be employed but their use is not required.

The reaction may be conducted by batch, semicontinuous, or continuous methods, using ordinary chemical equipment and techniques. The product may easily be separated from the aqueous medium by distilling off the water, preferably under reduced pressure, or by fractional crystallization, or by other well-known methods. The products so obtained are light-colored crystalline solids.

These products are characterized by a unique configuration that renders them unusually useful as detergent intermediates. When only one mole of alkali metal bisulfite is reacted with the epoxy aldehyde, reaction occurs at the epoxy ring. When two moles of bisulfite are present in the reaction, however, the carbonylic carbon atom of the epoxy carbonylic compound is substituted with both the sulfonate radical —$SO_3X$ and a hydroxyl radical. Under these conditions, the epoxy ring opens and one of its carbon atoms becomes hydroxylated while the other becomes sulfonated:

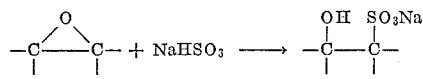

Thus, when one mole of sodium bisulfite is reacted with the epoxide of crotonaldehyde, the product has the structure

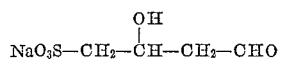

This ring opening reaction is unexpected in view of the well-known tendency of the formyl group to react and form bisulfite addition compounds of aldehydes. However, when at least two moles of bisulfite are reacted with the epoxy carbonylic compounds, novel polyhydroxy alkane polysulfonates are formed. For example, when 2,3-epoxypropanal, commonly termed glycidaldehyde, is reacted with at least about two moles of sodium bisulfite,

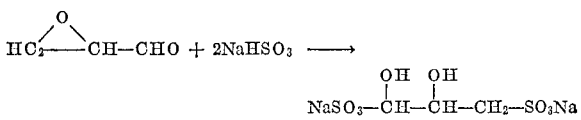

the product is disodium 1,2-dihydroxy-propane-1,3-disulfonate. Similarly, 1,2-epoxybutanone-3, reacted with 2 moles of potassium bisulfite, yields

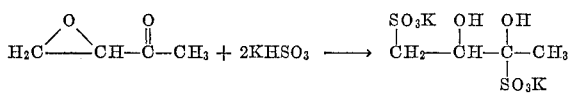

dipotassium-2,3 dihydroxybutane-1,3-disulfonate.

These products undergo a number of reactions which render them of particular interest as detergent intermediates, particularly when the polyhydroxy alkane polysulfonates are reacted with such long-chain saturated acids as lauric, myristic, palmitic, stearic, arachidic, and the like. The acids having from 12 to 18 carbon atoms are preferred since the esters resulting from their reaction with the intermediates of this invention make the most satisfactory detergents. Such novel esters are characterized by alkane chains having at least two carbon atoms therein substituted with the acyl radicals of long-chain fatty acids, and having at least two carbon atoms in the chain substituted with sulfonate radicals, at least one of which carbon atoms is also substituted with one of the noted acyl radicals. Such compounds are characterized by excellent surface activity and detergency, and are useful emulsifiers, wetting agents, and the like. One advantage they possess over conventional agents such as Syntex M (sodium glyceryl monolaurate sulfate) is that for a given number of carbon atoms, they possess more active substituents by virtue of the fact that some chain carbon atoms are substituted with both sulfonate and acyl radicals. Alpha-hydroxyalkanal beta-sulfonates, useful as intermediates for such other types of detergents as acetals, can readily be prepared from my novel polyhydroxy alkane polysulfonates by passing them over acidic ion exchange resins. For example, when disodium 1,2-dihydroxybutane-1,3-disulfonate is passed over Dowex 50 resin (a nuclear sulfonic acid-type cation exchange resin) in its $H^+$ form, the resulting product is sodium alpha-hydroxybutanal-3-sulfonate. The aldehyde function of such alkanals may be hydrogenated to hydroxyl over such catalysts as Raney nickel, affording another polyhydroxy alkane sulfonate detergent intermediate such as sodium 1,2-dihydroxybutane-3-sulfonate. The resulting sulfonates can readily be converted to sulfonic acids by treatment with $H^+$ Dowex resin. These materials may in turn be reacted with amines or with fatty acids to produce other compounds having surface active properties.

From these reactions, it will be readily seen that a wide variety of useful detergents and detergent intermediates may be easily and inexpensively prepared from my novel compounds.

The following examples will serve to illustrate the nature of my invention. It should be understood, however, that the examples are merely illustrative, and are not to be regarded as limitations on the appended claims, since the basic teachings therein may be varied at will as will be understood by a skilled organic chemist. In the examples, the ingredients are expressed in parts by weight unless otherwise indicated.

*Example I*

To 1650 milliliters of an aqueous solution containing 278 grams of glycidaldehyde at 20° C. was added 750 grams of sodium meta-bisulfite. The ensuing reaction was exothermic, raising the temperature of the reaction mixture to 60° C. in three minutes. The temperature of the solution was maintained at 60° C. for two hours. At the end of that time, no further epoxide could be detected in the reaction mixture. The solution was concentrated to about 1200 milliliters under reduced pressure and cooled and 800 milliliters of ethanol added.

The product precipitated from the resulting mixture as an oil which crystallized overnight to a light-colored solid, obtained in 95% yield. Analysis thereof gave the following data, corresponding to that for disodium 1,2-dihydroxypropane-1,3-disulfonate:

| | Percent | | |
|---|---|---|---|
| | C | H | S |
| Calculated for $C_3H_6O_8S_2Na_2$ | 12.88 | 2.14 | 22.82 |
| Found | 12.2 | 2.8 | 20.5 |

*Example II*

Using the techniques exemplified above, the following polyhydroxy alkane polysulfonates may be prepared from the following reactants in good yield:

| Epoxy Compound | Bisulfite | Product |
|---|---|---|
| 3,4-epoxybutanal | $NaHSO_3$ | Disodium-1,3-dihydroxybutane-1,4-disulfonate. |
| Epoxidized methyl vinyl ketone. | $KHSO_3$ | Dipotassium 2,3-dihydroxybutane-2,4-disulfonate. |
| 2,3-epoxypentanal | $NaHSO_3$ | Disodium-1,2-dihydroxypentane-1,3-disulfonate. |
| 2,3,4,5-diepoxypentanal | $KHSO_3$ | Tripotassium-1,2,4-trihydroxypentane-1,3,5-trisulfonate. |
| 2,3-epoxybutanedial | $KHSO_3$ | Tripotassium-1,2,4-trihydroxybutane-1,3,4-trisulfonate. |
| 2,3-epoxydecanal | $NaHSO_3$ | Disodium-1,2-dihydroxydecane-1,3-disulfonate. |

Example III

To 1650 ml. of an aqueous solution containing 278 grams of glycidaldehyde at 20° C. was added 375 grams of sodium meta-bisulfite. The reaction proved to be exothermic, the temperature of the reaction mixture rising to about 40° C. before the mixture was cooled in a water bath to room temperature. The mixture was maintained with stirring at room temperature for about 72 hours, at the end of which time its epoxide content was found to be negligible.

The solution was then concentrated by taking off the water under reduced pressure, and the residue triturated with hot ethanol. In this way a solid hygroscopic granular product was obtained which, upon vacuum drying, was found to be present in 95% yield. Analysis of the product gave the following data:

|  | Percent | | |
|---|---|---|---|
|  | C | H | S |
| Calculated for $C_3H_5O_5SNa$ | 20.45 | 2.84 | 18.18 |
| Found | 20.5 | 3.2 | 18.0 |

These data corresponded to that for sodium-2-hydroxy-2-formyl-ethane sulfonate.

Example IV

To a 25% aqueous solution containing 0.23 mole of disodium-1,2-dihydroxypropane-1,3-disulfonate which had been passed through a Dowex 50 column, was added 27 ml. of 3 N sodium hydroxide, enough to neutralize the solution to the phenol phthalein en point. The solution was diluted to 250 ml. and to it was added 15 grams of Raney nickel hydrogenation catalyst. The resulting mixture was then pressurized with hydrogen to an initial pressure of 1360 p.s.i.g. at 50° C. and held at this temperature until the pressure had decreased to 1000 p.s.i.g. The solution was then depressurized, cooled, filtered and passed over the acidic Dowex 50 resin column twice. The effluent from the column was stripped under reduced pressure to remove the water, leaving a dark brown syrupy liquid in 81% yield, based on the starting dihydroxypropane sulfonate.

The product was analyzed and was determined to be a mixture of 1,2-dihydroxy-3-propanesulfonic acid and 1,2-dihydroxy-3-propanesulfonic acid sultone (2-hydroxy-gamma propanesultone).

Example V

To 10 grams of disodium-1,2-dihydroxypropane-1,3-disulfonic acid was added an excess, about 20 grams, of palmityl chloride and 20 ml. of pyridine. An exothermic reaction thereupon took place, and solid pyridine hydrochloride was precipitated. The mixture was allowed to stand for several hours, treated with cold aqueous hydrochloride acid, and the water evaporated under reduced pressure. The residue was taken up in ethanol to remove the inorganic salts, and the washing procedure repeated several times.

The residue was found, on analysis, to consist mostly of 2-formyl-2-palmitoxyethanesulfonic acid.

I claim as my invention:

1. The hydroxyalkanal sulfonate consisting of a carbon chain of from three to ten carbon atoms; a hydroxyl radical on one of the chain carbon atoms; a sulfonate radical —$SO_3X$ attached to a chain carbon atom adjacent the hydroxyl-substituted carbon atom where X is selected from the group consisting of hydrogen and alkali metal atoms; and a formyl radical attached to a carbon atom of the chain.

2. The hydroxyalkanal sulfonate consisting of a carbon chain of from three to ten carbon atoms; a hydroxyl radical on one of the chain carbon atoms; an alkali metal sulfonate radical attached to a chain carbon atom adjacent the hydroxyl-substituted carbon atom; and a formyl radical attached to a carbon atom of the chain.

3. An alkali metal 2-hydroxy-2-formyl ethane sulfonate.

4. Sodium 2-hydroxy-2-formyl ethane sulfonate.

5. Alkali metal 1-hydroxy-1-formyl propane-2-sulfonate.

6. Sodium 2-hydroxy-3-formyl propane sulfonate.

References Cited in the file of this patent

UNITED STATES PATENTS

| 2,671,800 | Copenhaver | Mar. 9, 1954 |
| 2,693,489 | Kleinschmidt | Nov. 2, 1954 |
| 2,810,747 | Sextan et al. | Oct. 22, 1957 |
| 2,887,498 | Hearne et al. | May 19, 1959 |
| 2,945,045 | Levy et al. | July 12, 1960 |

OTHER REFERENCES

Whitmore: Organic Chemistry, Second Edition, pp. 190 (1951). (Copy in Sci. Library.)

Suter: "The Organic Chemistry of Sulfur," 1944, pages 126 to 136. (Copy in Sci. Library.)